3,480,388
PREPARATION OF HYDRARGILLITE CRYSTALS

Max Michel, Sarcelles-les-Rosiers, Val-d'-Oise, France, assignor to Produits Chimiques Pechiney-Saint Gobain, Neuilly-sur-Seine, France
No Drawing. Filed May 16, 1966, Ser. No. 550,164
Claims priority, application France, May 21, 1965, 17,902
Int. Cl. C01f 7/00
U.S. Cl. 23—143             5 Claims

ABSTRACT OF THE DISCLOSURE

The manufacture of fine, separated crystals of hydrargillite having a specific surface area as high as 100 m.$^2$/g. by providing an amorphous alumina gel containing a monovalent anion in the molar ratio to alumina of at least 0.1, digesting the gel at a temperature within the range of room temperature to 60° C. for at least two days under non-dessicating conditions using the digested gel as seed in an aluminate solution in an amount up to 20% by weight based upon alumina in the gel to alumina in the mixture, and separating the hydrargillite precipitated from the mixture.

---

This invention relates to the preparation of hydrargillite crystals and particularly to the preparation of same from sodium aluminate.

Hydrargillite, known as the trihydrate of aluminum, is used commercially on a large scale in the electrolytic manufacture of aluminum. It has been prepared by decomposition of sodium aluminate liquors derived from alkaline decomposition of bauxites. In present practice, effort is made to exploit the decomposition of the aluminate liquor in a manner to obtain the greatest possible amount of alumina having the desired physical characteristics, and especially having a microscopic texture, in order to avoid difficulties in subsequent filtration steps and during the steps of washing and calcining. Instead, the alumina often forms into agglomerates of crystals which are only several microns in dimension. Extensive studies have been conducted to determine the factors so operating to influence the aluminate decomposition such as the nature of the seeds used to nucleate crystal formation, the temperature of the aluminate liquors, the concentration of Na and Al, and finally the amount of agitation during crystal formation. Amongst these factors, the nature of the seeds with which the liquor is inoculated appears to play a very important role, especially since the correct seeds for formation of alumina for electrolyte purposes comprise crystalline agglomerates prepared to certain dimensions in the preceding step. It has been known for some time that, unless the seed material and decomposition conditions are clearly defined, any alumina or even completely different kinds of powders capable of precipitation of alumina form aluminate liquors and operate to produce hydrargillite of irregular crystal size and which have no practical value.

When the crystals of hydrargillite are present in the form of thin scales of hexagonal shape and if they have a white color, such crystals, before or after transformations, can advantageouslsy be employed as an industrial material in abrasives, paints, lacquers, rubber, etc. However, all such applications require elementary crystals having the correct uniformity in dimension and crystals that remain separated one from another.

Attempts have been made to produce such separated hydrargillite crystals of uniform dimension either by resorting to very special and highly improved decomposition methods for the sodium aluminate liquors, in which use is made of specially defined seed crystals, or by use of freshly precipitated alumina gels prepared from alumina salts.

For the development of freshly precipitated alumina gels, a number of procedures were recommended which resulted in formation of masses of crystals of lamellar shape and of regular structure, and which contained little, if any, other crystalline forms of alumina. The French Patent No. 1,367,553 describes a procedure for the preparation of an alumina gel in two steps wherein the gel contains a certain amount of monovalent anions. The first step is carried out at a temperature near room temperature for at least two days and the second step occurs at a higher temperature which does not exceed 120° C. The reaction is carried out in an ammonia or amine containing media.

In the French Patent No. 1,371,808, the products obtained in a first treatment step of amorphous alumina gels at about room temperature are made up of masses of large active surface of an exceedingly fine hydrargillite structure, as determined by X-ray patterns and by the electron microscope which recognizes only the presence of small lamellae. If the digestion time is reduced, a recognizable X-ray pattern will not be created but the second step, which is carried out in a medium containing ammonia or an amine, will yield large masses made up of individual hydrargillite crystals.

The two step crystal growth described in the French Patent No. 1,367,553 furnishes hydrargillites which are very pure and fine and of commercial interest but this process makes use of a large number of chemicals in fairly large amounts.

Furthermore, amongst the improved decomposition processes for sodium aluminate liquors addressed to the preparation of hydrargillite in the form of individual and regular crystals, mention should be made of the use of special decomposition seeds prepared by aging amorphous, precipitated gels in alkaline solutions. The formed seeds, which are of a heterogeneous structure consisting in part of hydrargillite, permit individual hydrargillite crystals to be easily obtained but it remains difficult to obtain uniform crystals having a large active surface and which consists of very fine lamellae of very small dimension.

It is an object of this invention to provide a decomposition process for aluminates which makes use of characteristics and conditions that are easily obtainable for use in a commercial operation; which produces crystals of hydrargillite of a desired degree of fineness and which produces very fine crystals of uniform dimension and of the type suitable for the paint industry.

It is another object of this invention to provide a new and improved method for producing hydrargillite crystals which are of fine dimension, uniform construction and which retain their separated relationship.

The concept of this invention resides in the discovery that the desired homogeneous masses having a hydrargillite structure can be obtained by decomposition of aluminate liquors with the use of seeds obtained of amorphous alumina gels at an acid pH.

This invention is addressed to a procedure for the preparation of individual, regular and crystographically pure crystals of hydrargillite which are extremely fine, as evidenced by an active surface as high as 100 m.$^2$/g. and with the crystals having a thickness within the range of 80–550 A. In accordance with the practice of this invention, an amorphous alumina gel, which contains at least 0.1 molecular weight of monovalent anions, expressed on the basis of mol ratio of the anion to alumina ($Al_2O_3$) in the gel, is subjected to a first digestion at a temperature within the range of room temperature to 60° C. for at least two days. The pre-digested gel is then added to a solution of the Na aluminate in an amount to provide a ratio of alumina in the digested gel-inoculum in which the total alumina in the mixture may be as high as 20% by weight. The precipitation of hydrargillite is allowed to occur during a time which may range between ½ hour to 3 days at a temperature within the range of room temperature to 70° C. The formation of hydrargillite crystals is terminated and the hydrargillite formed is dried and washed by techniques known to the prior art.

The aluminate decomposition will depend somewhat on the conditions previously described in the introductory portion. A decomposition temperature higher than room temperature will operate to slow down the rate of decomposition and will favor the formation of crystals of larger dimension. A high concentration of alumina in the aluminate solution accelerates the precipitation period. A rather high concentration of NaOH and/or of $Na_2CO_3$ in the aluminate solutions will limit the precipitation and a long period of decomposition favors the formation of crystals of relatively large dimension.

The following examples, which are given by way of illustration but not by way of limitation, show that the parameters can be varied over a fairly wide range if the inoculation is brought about with gels that have been digested long enough to show a hydrargillite structure. The examples also show that by correctly combining the various possibilities, it is possible to achieve any desired granulometry of the hydrargillite precipitates.

EXAMPLE 1

An alumina gel is precipitated continuously from a solution of Na aluminate which contains 100 g. of alumina per liter, expressed as $Al_2O_3$, where the ratio of $Na_2O/Al_2O_3$ is 1.5. The precipitation is carried out with a solution of nitric acid of a suitable concentration and in a ratio whereby the gel, after suction drying and washing on the filter, furnishes a filter cake which has a ratio of $NO_3/Al_2O_3$ of 0.2. The cake is allowed to age for 4 days at 60° C. while protected to prevent desiccation. The cake is mixed into a solution of aluminate formed of 141 g. $Na_2O$ per liter and 128 g. of $Al_2O_3$ per liter and the aluminate solution is maintained at 30° C. 10% of alumina, as seed cake, per total alumina in the mixture is incorporated and the mixture is maintained under a state of constant agitation for 15 hours. The gel cake, which serves as inoculum, has a weak hydrargillite pattern in the X-ray diagram and a specific surface of 140 m.$^2$/g.

The hydrargillite obtained by the use of such seed inoculum is in the form of very regular crystals of less than 0.1 micron in dimension and it has an active surface of 40 m.$^2$/g. The calculated thickness is approximately 210 A. The yield of precipitated alumina, expressed in percent of the $Al_2O_3$ present in the aluminate, is 70%.

EXAMPLE 2

An alumina gel is prepared as in Example 1 by mixing Na aluminate mixture and nitric acid in an amount whereby the suction dried and washed cake has a ratio of $NO_3/Al_2O_3$ of 0.24. This cake is aged while being protected against drying out for two months at 30° C. Its specific surface is 200 m.$^2$/g. and it shows a clearcut hydrargillite pattern in the X-ray diagram. The ripened gel is mixed with a solution of sodium aluminate which contains 169 grams of $Na_2O$ and 166 grams of $Al_2O_3$ per liter. The seed inoculum is added in an amount to constitute 10% of the total alumina present in the mixture. This mixture is maintained, with continuous agitation, for one hour at 30° C. After filtration under suction and washing, a hydrargillite is obtained in the form of regular crystals having a specific surface of 80 m.$^2$/g. and an average thickness of roughly 110 A. The yield of alumina is 40%.

EXAMPLE 3

The procedure corresponds to that of the preceding Example 2 except that the mixture of seed inoculum and sodium aluminate is maintained for 3 hours at 30° C. The crystals of hydrargillite obtained have an average thickness of 140 A. and a specific surface of 60 m.$^2$/g. The yield of alumina is 63%.

EXAMPLE 4

The procedure corresponds to Examples 2 and 3 except that the mixture of seed inoculum in sodium aluminate is maintained for 10 hours at 30° C. The crystals of hydrargillite obtained have an average thickness of 210 A. and a specific surface of 40 m.$^2$/g. The yield with respect to alumina is 72%.

EXAMPLE 5

The seed inoculum is the same as that used in Examples 2, 3 and 4. The seed is mixed with sodium aluminate in an amount to constitute 3% of the total $Al_2O_3$ present. The aluminate solution into which the seed inoculum is mixed has an analysis of 141 g. $Na_2O$ and 133 g. of $Al_2O_3$ per liter. The decomposition is allowed to take place for 6 hours at 30° C. The crystals obtained have an average thickness of 180 A. and a specific surface of 45 m.$^2$/g. The yield of alumina is 61%.

EXAMPLE 6

The seed inoculum is the same as in Example 2, 3, 4 and 5. The inoculum is mixed with sodium aluminate in an amount whereby the $Al_2O_3$ content will constitute 10% of the alumina in the finished master. The sodium aluminate has the composition given in Example 5. The decomposition is allowed to take place for 15 hours at 60° C. The crystals obtained have a dimension of about 0.5 mm., an average thickness of 550 A., and a specific surface of 15 m.$^2$/g. The yield with respect to alumina is 60%.

EXAMPLE 7

An alumina gel is precipitated by mixing nitric acid with sodium aluminate in amounts whereby the washed and filtered gel furnishes a filter cake in which the ratio of $NO_3/Al_2O_3$ is 0.18. The cake is aged for 6 months at 30° C. while being protected from drying out. A seed inoculum is obtained having an X-ray diagram and which shows a strong pattern of hydrargillite and a specific surface of 120 m.$^2$/g. The seed inoculum is mixed with a sodium aluminate solution containing 120 g. $Na_2O$ and 53 g. $Al_2O_3$ per liter. The seed inoculum is added in an amount whereby the alumina in the inoculum makes up 16% of the total alumina present. The mixture is maintained for 10 hours at 25° C. The crystals of hydrargillite obtained have an average thickness of 150 A. and specific surface of 55 m.$^2$/g. The yield with respect to alumina is 15%.

EXAMPLE 8

The mixture of seed inoculum and sodium aluminate of the preceding example is maintained for 47 hours at 25° C. The crystals of hydrargillite obtained have an average thickness of 180 A. and a specific surface of 45 m.$^2$/g. The yield with respect to alumina is 55%.

EXAMPLE 9

Alumina gel is precipitated under continuous agitation from a sodium aluminate solution which contains 100 g. alumina per liter, expressed as $Al_2O_3$, by using a hydrochloric acid solution of suitable concentration in an amount to adjust the pH to 7.8 during the precipitation. The filter cake of alumina, which is suction dried and washed, has a ratio of $Cl/Al_2O_3$ of 0.23. The filter cake is allowed to age for 10 days at 40° C. It is used as a seed inoculum in an aluminate solution corresponding to that of Example 1 and following the conditions prescribed in Example 1. The hydrargillite obtained has a surface of 42 m.²/g. The yield with respect to alumina is 71%.

It will be understood that the concepts of this invention are addressed not only to the procedure for the preparation of the hydrargillite crystals but to the new and novel crystals of hydrargillite that are produced by the process.

In the claims:

1. In the method for the manufacture of fine, separated crystals of hydrargillite having a specific surface as high as 100 m.²/g., the steps comprising providing an amorphous alumina gel containing a monovalent anion of an acid in the molar ratio of anion to alumina in the gel, calculated as $Al_2O_3$, of at least 0.1, digesting the amorphous alumina gel at a temperature within the range of room temperature to 60° C. for at least two days, mixing the digested gel as seed inoculum with a sodium aluminate solution in an amount up to 20% by weight calculated on the basis of the alumina in the gel to the total alumina in the mixture to precipitate hydrargillite in the form of fine, separated crystals while the mixture is maintained at a temperature which does not exceed 70° C., and separating the hydrargillite precipitated from the mixture.

2. The method as claimed in claim 1 in which the digesting is carried out while protecting the mixture from drying out and in which precipitation is continued for a period within the range of ½ hour to 3 days.

3. The method as claimed in claim 1 which includes the step of agitating the mixture during precipitation.

4. The method as claimed in claim 1 which includes the steps of filtering to separate the precipitate and washing the precipitate.

5. The method as claimed in claim 1 in which the acid is selected from the group consisting of nitric acid and hydrochloric acid.

References Cited

UNITED STATES PATENTS

| 2,656,250 | 10/1953 | Thibon et al. | 23—143 |
| 2,881,051 | 4/1959 | Pingard | 23—143 |
| 3,380,933 | 4/1968 | Michel et al. | 23—141 X |
| 3,411,876 | 11/1968 | Michel et al. | 23—143 |
| 3,411,877 | 11/1968 | Michel et al. | 23—143 |

FOREIGN PATENTS

| 663,459 | 12/1951 | Great Britain. |
| 1,371,808 | 8/1964 | France. |

OSCAR R. VERTIZ, Primary Examiner

G. T. OZAKI, Assistant Examiner

U.S. Cl. X.R.

23—141